US009525710B2

(12) United States Patent
Weißmann et al.

(10) Patent No.: US 9,525,710 B2
(45) Date of Patent: Dec. 20, 2016

(54) SEAMLESS SWITCH OVER FROM CENTRALIZED TO DECENTRALIZED MEDIA STREAMING

(75) Inventors: Marc Weißmann, Riedstadt (DE); Guido Nitsch, Wegberg (DE); Werner Brinkmann, Niederkrüchten (DE)

(73) Assignee: Avaya GmbH & Co., KG (DE)

( * ) Notice: Subject to any disclaimer, the term of this patent is extended or adjusted under 35 U.S.C. 154(b) by 1768 days.

(21) Appl. No.: 12/433,334

(22) Filed: Apr. 30, 2009

(65) Prior Publication Data
US 2010/0189097 A1 Jul. 29, 2010

Related U.S. Application Data

(60) Provisional application No. 61/148,220, filed on Jan. 29, 2009.

(51) Int. Cl.
*H04L 12/66* (2006.01)
*H04L 29/06* (2006.01)

(52) U.S. Cl.
CPC ......... *H04L 65/1069* (2013.01); *H04L 65/103* (2013.01); *H04L 65/1083* (2013.01); *H04L 65/80* (2013.01)

(58) Field of Classification Search
None
See application file for complete search history.

(56) References Cited

U.S. PATENT DOCUMENTS

| | | | |
|---|---|---|---|
| 5,035,252 A | 7/1991 | Mondre | |
| 5,537,447 A | 7/1996 | Urbansky | |
| 5,619,514 A | 4/1997 | Smith | |
| 5,745,425 A | 4/1998 | Anderson et al. | |
| 5,859,882 A | 1/1999 | Urbansky | |
| 5,920,507 A | 7/1999 | Takeuchi et al. | |
| 6,141,788 A | 10/2000 | Rosenberg et al. | |
| 6,170,075 B1 | 1/2001 | Schuster et al. | |
| 6,243,836 B1 | 6/2001 | Whalen | |
| 6,260,071 B1 | 7/2001 | Armistead et al. | |
| 6,381,645 B1 | 4/2002 | Sassin | |

(Continued)

FOREIGN PATENT DOCUMENTS

| | | |
|---|---|---|
| DE | 10211740 | 10/2003 |
| DE | 102006027708 | 2/2008 |

(Continued)

OTHER PUBLICATIONS

Search Report for UK patent Application No. GB1001409.0, dated May 6, 2010.

(Continued)

*Primary Examiner* — Jae Y Lee
*Assistant Examiner* — Alan Lindenbaum
(74) *Attorney, Agent, or Firm* — Sheridan Ross P.C.

(57) ABSTRACT

A media gateway is provided that enables seamless switchover between a centralized media stream passing between first and second endpoints and through the media gateway and a decentralized media stream passing between the first and second endpoints, but bypassing the media gateway. The gateway provides synchronization information to the first and second endpoints to enable synchronization of the centralized and decentralized media streams. After synchronization is completed, the centralized media stream is disconnected in favor of the decentralized media stream.

20 Claims, 10 Drawing Sheets

PARALLEL MEDIA STREAMING

(56) References Cited

U.S. PATENT DOCUMENTS

| | | |
|---|---|---|
| 6,434,590 B1 | 8/2002 | Blelloch et al. |
| 6,434,606 B1 | 8/2002 | Borella et al. |
| 6,452,950 B1 | 9/2002 | Ohlsson et al. |
| 6,650,637 B1 | 11/2003 | Bansal et al. |
| 6,690,675 B1 | 2/2004 | Kung et al. |
| 6,763,226 B1 | 7/2004 | McZeal, Jr. |
| 6,769,027 B1 | 7/2004 | Gebhardt et al. |
| 6,771,644 B1 * | 8/2004 | Brassil et al. ............... 370/390 |
| 6,823,047 B1 | 11/2004 | Cruickshank |
| 6,845,129 B2 | 1/2005 | Golin |
| 6,862,298 B1 | 3/2005 | Smith et al. |
| 6,879,582 B1 | 4/2005 | Dhara et al. |
| 6,914,964 B1 | 7/2005 | Levine |
| 6,977,948 B1 | 12/2005 | Chennubhotla et al. |
| 7,203,193 B2 | 4/2007 | Hoof |
| 7,215,959 B2 | 5/2007 | Creamer et al. |
| 7,293,176 B2 | 11/2007 | Otway et al. |
| 7,352,766 B2 | 4/2008 | Van Asten et al. |
| 7,359,979 B2 | 4/2008 | Gentle et al. |
| 7,385,985 B2 | 6/2008 | Narsinh et al. |
| 7,386,115 B2 | 6/2008 | Peters |
| 7,418,002 B2 | 8/2008 | Robotham et al. |
| 7,440,430 B1 * | 10/2008 | Jagadeesan et al. .......... 370/331 |
| 7,496,750 B2 | 2/2009 | Kumar et al. |
| 7,626,994 B2 | 12/2009 | Bennett |
| 7,627,097 B2 | 12/2009 | Kawabata et al. |
| 7,702,947 B2 | 4/2010 | Peddada |
| 7,852,815 B2 * | 12/2010 | Kezys ........................... 370/338 |
| 2001/0028634 A1 | 10/2001 | Huang et al. |
| 2002/0073208 A1 | 6/2002 | Wilcock et al. |
| 2002/0085516 A1 | 7/2002 | Bridgelall |
| 2002/0101853 A1 | 8/2002 | Siegrist et al. |
| 2003/0163328 A1 | 8/2003 | Rambo et al. |
| 2003/0198218 A1 | 10/2003 | Farris et al. |
| 2004/0057445 A1 | 3/2004 | LeBlanc |
| 2004/0076190 A1 | 4/2004 | Goel et al. |
| 2004/0120309 A1 | 6/2004 | Kurittu et al. |
| 2004/0233898 A1 | 11/2004 | Otsuka et al. |
| 2005/0074008 A1 | 4/2005 | Herledan et al. |
| 2005/0094618 A1 | 5/2005 | Colban et al. |
| 2005/0249146 A1 | 11/2005 | Pinault et al. |
| 2006/0007915 A1 | 1/2006 | Frame |
| 2006/0062371 A1 | 3/2006 | Vanderheiden et al. |
| 2006/0083199 A1 | 4/2006 | Yang |
| 2006/0126667 A1 | 6/2006 | Smith et al. |
| 2006/0140221 A1 | 6/2006 | Yamada et al. |
| 2006/0166716 A1 | 7/2006 | Seshadri et al. |
| 2006/0203805 A1 | 9/2006 | Karacali-Akyamac et al. |
| 2006/0233158 A1 | 10/2006 | Croak et al. |
| 2006/0251051 A1 | 11/2006 | Bhatt et al. |
| 2006/0256772 A1 | 11/2006 | Yarlagadda |
| 2006/0277051 A1 | 12/2006 | Barriac et al. |
| 2007/0026852 A1 | 2/2007 | Logan et al. |
| 2007/0081460 A1 | 4/2007 | Karacali-Akyamac et al. |
| 2007/0110034 A1 | 5/2007 | Bennett |
| 2007/0147399 A1 | 6/2007 | Deng et al. |
| 2007/0167156 A1 | 7/2007 | Hundal |
| 2007/0177579 A1 | 8/2007 | Diethorn et al. |
| 2007/0183323 A1 | 8/2007 | Hannu et al. |
| 2007/0211704 A1 | 9/2007 | Lin et al. |
| 2007/0223467 A1 | 9/2007 | Makiuchi et al. |
| 2007/0280428 A1 | 12/2007 | McClelland |
| 2007/0291733 A1 | 12/2007 | Doran et al. |
| 2008/0002689 A1 | 1/2008 | Vera |
| 2008/0013528 A1 | 1/2008 | Miller et al. |
| 2008/0089289 A1 | 4/2008 | Jayaram et al. |
| 2008/0165708 A1 | 7/2008 | Moore et al. |
| 2008/0187108 A1 | 8/2008 | Engelke et al. |
| 2008/0205377 A1 | 8/2008 | Chao et al. |
| 2008/0232353 A1 | 9/2008 | Vafin et al. |
| 2008/0232442 A1 | 9/2008 | Rodbro et al. |
| 2008/0240004 A1 | 10/2008 | Shaffer et al. |
| 2008/0285599 A1 | 11/2008 | Johansson et al. |
| 2008/0298336 A1 | 12/2008 | Gollamudi |
| 2008/0298349 A1 | 12/2008 | Beightol et al. |
| 2008/0310398 A1 | 12/2008 | Jain et al. |
| 2009/0074012 A1 | 3/2009 | Shaffer et al. |
| 2009/0213837 A1 | 8/2009 | Ku et al. |
| 2009/0234940 A1 | 9/2009 | Pal et al. |
| 2009/0235329 A1 | 9/2009 | Chavez et al. |
| 2010/0165857 A1 | 7/2010 | Meylan et al. |

FOREIGN PATENT DOCUMENTS

| | | |
|---|---|---|
| EP | 0152251 | 8/1985 |
| EP | 1471708 | 10/2004 |
| EP | 1515506 | 3/2005 |
| EP | 1681844 | 7/2006 |
| EP | 1729490 | 12/2006 |
| EP | 2014020 | 1/2009 |
| EP | 2056640 | 5/2009 |
| WO | WO 98/44693 | 10/1998 |
| WO | WO 99/41876 | 8/1999 |
| WO | WO 2007/124577 | 11/2007 |
| WO | WO 2007/131296 | 11/2007 |

OTHER PUBLICATIONS

Wikipedia "H.323"; http://en.wikipedia.org/w/index.php?title=H.323&printable=yes Dec. 18, 2008.
Wikipedia "RTP Control Protocol"; http://en.wikipedia.org/w/index.php?title=RTP_Control_Protocol< . . . Jan. 9, 2009.
Wikipedia "Voice over Internet Protocol"; http://en.wikipedia.org/wiki/Voice_over_Internet_Protocol Jan. 23, 2009.
Wikipedia "H.245"; http://en.wikipedia.org/wiki/H.245 Nov. 9, 2009.
U.S. Appl. No. 12/406,784, filed Mar. 18, 2009, Michaelis et al.
U.S. Appl. No. 12/486,605, filed Jun. 17, 2009, Michaelis et al.
U.S. Appl. No. 12/430,697, filed Apr. 27, 2009, Michaelis et al.
U.S. Appl. No. 12/426,023, filed Apr. 17, 2009, Michaelis et al.
U.S. Appl. No. 12/548,271, filed Aug. 26, 2009, Michaelis et al.
U.S. Appl. No. 12/361,950, filed Jan. 29, 2009, Michaelis et al.
U.S. Appl. No. 12/371,065, filed Feb. 13, 2009, Michaelis et al.
Azuri, "Edgewater Networks, Inc. Announces Extension of VoIP Failover Capabilities at the Enterprise Edge", http://74.125.95.104/search?q=cache:JgCKutpPN7gJ:voipservices.tmcnet.com/feature/article, Nov. 16, 2007, printed on Dec. 3, 2008, pp. 1-3.
Counterpath Corporation; "Network Convergence Gateway (NCG)", Internet Article printed on Nov. 25, 2008 from http://www.counterpath.com/network-convergence-gateway-ncg.html; 2 pages.
Gurock, et al., "Selecting the Right License Strategy for your Software", printed on Jul. 25, 2009, from the Internet at http://blog.gurock.com/articles/selecting-the-right-license-strategy-for-your-software, 6 pages.
"Indepth: Jitter", VoIP Troubleshooter website, available at http://www.voiptroubleshooter.com/indepth/jittersources.html, accessed on Oct. 22, 2009, pp. 1-8.
Stevenson; "F/MC Watch: MobileSTICK a Silver Lining for Mobile Operators"; Internet Article printed on Feb. 6, 2009 from http://www.voipplanet.com/solutions/article.php/3670276; 6 pages. dated Apr. 7, 2007.
Webopedia; What is jitter buffer?—A Word Definition for the Webopedia Computer Dictionary; printed from http://www.webopedia.comITERM/J/jitter_buffer.html on Mar. 10, 2009; 6 pages.
Wikipedia; "Network switching subsystem"; Internet Article printed on Feb. 6, 2009 from http://en.wikipedia/org/wiki/Home_Location_Register; 10 pages.
Wikipedia; "Subscriber Identity Module"; Internet Article printed on Feb. 6, 2009 from http://en.wikipedia.org/wiki/Subscriber_Identity_Module; 8 pages.
Wikipedia; Jitter—From Wikipedia, the free encyclopedia; printed from http://en.wikipedia.org/wiki/Jitter on Mar. 10, 2009; 6 pages.
Hahn N: "Dialog Via Internet Call Center" Nachrichtentechnik Elektronik, Veb Verlag Technik. Berlin, DE, vol. 48, No. 4, Jul. 1, 1998 pp. 17-19, XP000784128, ISSN: 0323-4657.
Background for the above captioned application (previously provided).

(56) References Cited

OTHER PUBLICATIONS

Official Action for Germany Patent Application No. 102010005566.2, dated Sep. 3, 2013 10 pages.
Official Action for United Kingdom Patent Application No. GB1001409.0, dated Aug. 28, 2013 3 pages.

* cited by examiner

100

200

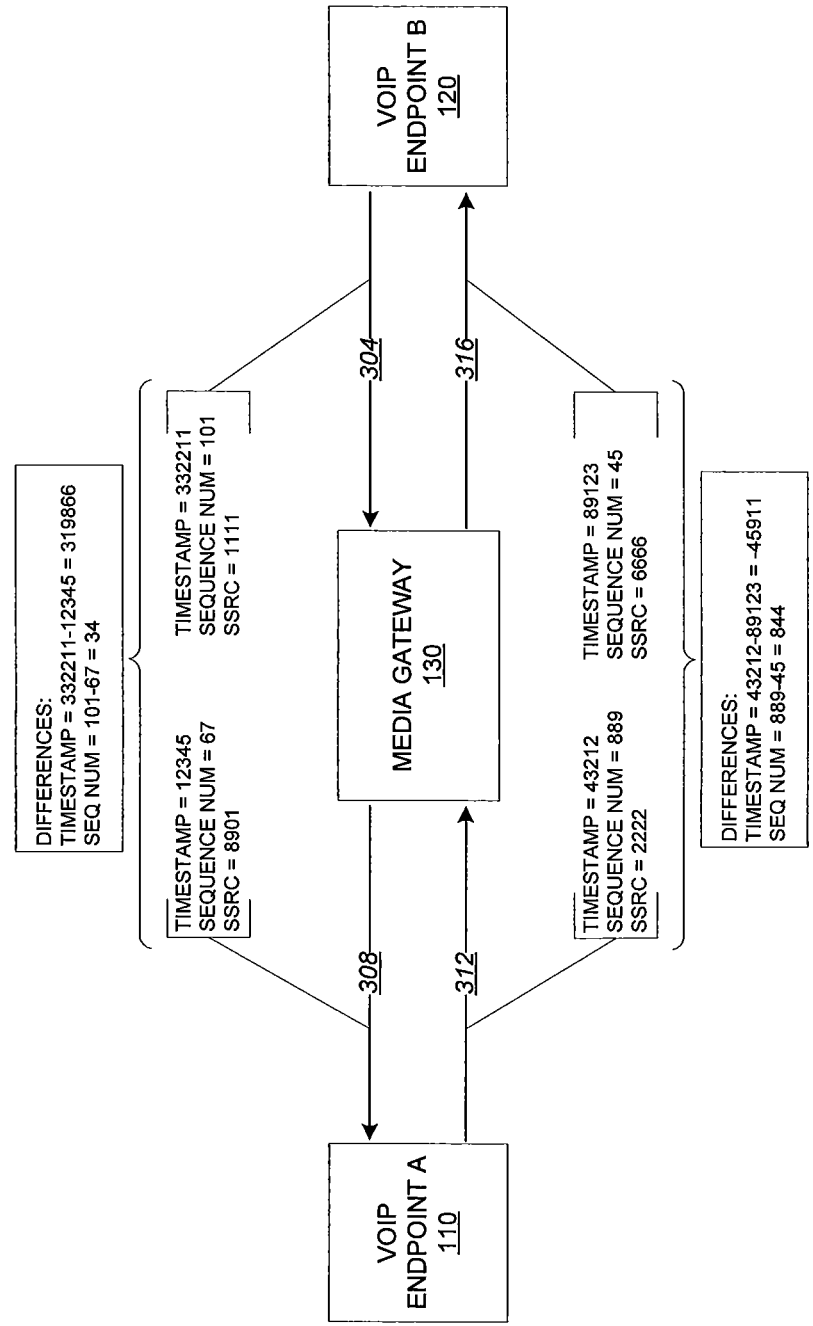

400

PARALLEL MEDIA STREAMING

500
DECENTRALIZED MEDIA STREAMING

700

800

*900*

SEAMLESS SWITCH OVER FROM CENTRALIZED TO DECENTRALIZED MEDIA STREAMING

CROSS REFERENCE TO RELATED APPLICATION

This application claims the benefit of U.S. Provisional Patent Application Ser. No. 61/148,220 filed on Jan. 29, 2009, the entire disclosure of which is hereby incorporated herein by reference.

FIELD

The application relates generally to communication systems and particularly to packet-based telecommunication systems.

BACKGROUND

The present disclosure is generally directed to media streams in the area of communications and more specifically in the area of voice over internet protocol (VOIP).

In VOIP systems, a voice call may be setup by a central call control providing centrally generated media streams and dial tones from a central media gateway. Once the call is established, the control of the media stream as well as the path of the media stream between caller and callee is usually transferred to a decentralized configuration. Transferring the media stream to a decentralized configuration releases the media gateway. The switching from centralized to decentralized media streams can result in audible clipping when the talk path between the caller and the callee is broken for a short period of time. The primary cause of the clipping is that the media stream (RTP stream) of the media gateway (e.g., VoIPBoard in the media gateway) is stopped and the caller's phone sends its media stream directly to the callee's phone (otherwise known as switch over) and vice versa. For that reason the jitter buffers of both phones have to be re-synchronized, which may result in audible clipping and be offensive to the listener or viewer.

The lack of synchronization is due to a difference in timing of packets received by a node (e.g., a caller phone, a callee phone, a media gateway) as a result of network latency variation, network congestion, timing drift, packet route changes and media gateway processing delays. The lack of synchronization between an incoming centralized and decentralized media stream results in anomalous data on switch over. The anomalous data may cause aspects of a spoken conversation to be lost during this switch over, and therefore, portions of a conversation may need to be repeated.

Some current systems avoid the clipping during switch over by using decentralized media streams from the beginning. This, however, presents other problems as dial tones from the media gateway can then no longer be used, meaning each IP telephone must support local tones. If announcements have to be played (e.g., from the local carrier) this workaround will fail, and thus a central media gateway must be used.

Certain embodiments of the present disclosure address these and other problems.

SUMMARY

The present disclosure is directed to synchronization of parallel media streams.

In a first embodiment, a method is provided that includes the steps of:
(a) setting up, by a media gateway, a centralized media stream passing between a first and a second endpoint and through the media gateway;
(b) setting up a decentralized media stream passing between the first and second endpoints, but bypassing the media gateway, the centralized and decentralized media streams being temporally overlapping;
(c) synchronizing, by at least one of the first and second endpoints, the centralized and decentralized media streams; and
(d) in response to step (c), disconnecting, by the at least one of the first and second endpoints, the centralized media stream while continuing the decentralized media stream.

In a second embodiment, a media gateway is provided that includes a processor operable to:
(a) set up a centralized media stream passing between a first and a second endpoint and through the media gateway;
(b) set up a decentralized media stream passing between the first and second endpoints, but bypassing the media gateway, the centralized and decentralized media streams being temporally overlapping;
(c) provide synchronization information to at least one of the first and second endpoints to enable synchronization by the at least one of the first and second endpoints of the centralized and decentralized media streams; and
(d) after synchronization is completed, disconnect the centralized media stream in favor of the decentralized media stream.

In a third embodiment, an endpoint is provided that includes:
(a) a network communication interface in communication with a centralized media stream passing through a media gateway and terminating at a remote endpoint and a decentralized media steam terminating at the remote endpoint and bypassing the media gateway, the centralized and decentralized media streams being simultaneously active;
(b) a call control operable to receive synchronization information from the media gateway and synchronize the centralized and decentralized media streams to enable switch over from the centralized media stream to the decentralized media stream.

Synchronization can minimize substantially audible clipping due to switching from the centralized media stream to the decentralized media stream because the information of both media streams is used to switch over seamlessly. Synchronization is typically performed by the media gateway calculating the difference between the incoming media stream (e.g., Realtime Transport Protocol ("RTP")) to the gateway from one voice endpoint (e.g., phone) and the outgoing media stream from the media gateway to the other voice endpoint. Synchronization information, which typically includes not only the calculated difference but also the synchronization source identifier ("SSRC") of the other endpoint, is sent to one or both voice endpoints by a signaling protocol, such as the Remote Access Service ("RAS") protocol. The difference is typically between packet timestamps and sequence numbers for a common packet (or a packet having the same payload) received by the gateway from one endpoint and sent by the gateway to the other endpoint. Using the calculated difference, the centralized and decentralized media streams can be re-synchronized within the jitter buffer of a voice endpoint. The voice endpoint generally determines the correct time to switch over from the centralized and decentralized media stream so that the talk path between both parties is not disrupted.

Synchronization may have one or more preconditions. A first precondition is that, after the signaling message to switch over is sent out, the centralized and decentralized media streams are maintained in parallel for a short period of time. A second precondition is that the difference between the incoming and outgoing media streams is calculated for one sampled audio data (or packet payload) within the talk path. A third precondition is that the centralized and decentralized media streams need to be active simultaneously for a short period of time.

When performed properly, jitter buffer synchronization can prevent the talk path between the caller and callee from being broken for a short period of time as a result of the switch over from the media stream of the gateway to the media stream flowing directly between the caller and callee voice endpoints.

The summary is neither intended nor should it be construed as being representative of the full extent and scope of the present disclosure. The present disclosure is set forth in various levels of detail in the summary as well as in the attached drawings and the detailed description and no limitation as to the scope of the present disclosure is intended by either the inclusion or non-inclusion of elements, components, etc. in this summary. Additional aspects of the present disclosure will become more readily apparent from the detailed description, particularly when taken together with the drawings.

BRIEF DESCRIPTION OF THE DRAWINGS

FIG. 3 shows a centralized media stream.

The accompanying drawings, which are incorporated in and constitute a part of the specification, illustrate embodiments of the disclosure, and together with the general description of the disclosure given above and the detailed description of the drawings given below, serve to explain the principles of the embodiments disclosed herein.

It should be understood that the drawings are not necessarily to scale. In certain instances, details that are not necessary for an understanding of the disclosure, or which render other details difficult to perceive, may have been omitted. It should be understood, of course, that the disclosure is not necessarily limited to the particular embodiments illustrated herein.

DETAILED DESCRIPTION

A system and method for seamless switch over from centralized to decentralized media streaming in packet-based telecommunication systems is described herein. Such a system and method for switch over can be used in a wide range of communications devices.

While the present disclosure provides several embodiments of the present disclosure, individuals skilled in the art will understand that the embodiments described herein are not intended to limit the disclosure to only these embodiments. The present disclosure is intended to cover alternatives, modifications and equivalents that may be included within the spirit and scope of the disclosure as defined by the claims below.

Figure 1:
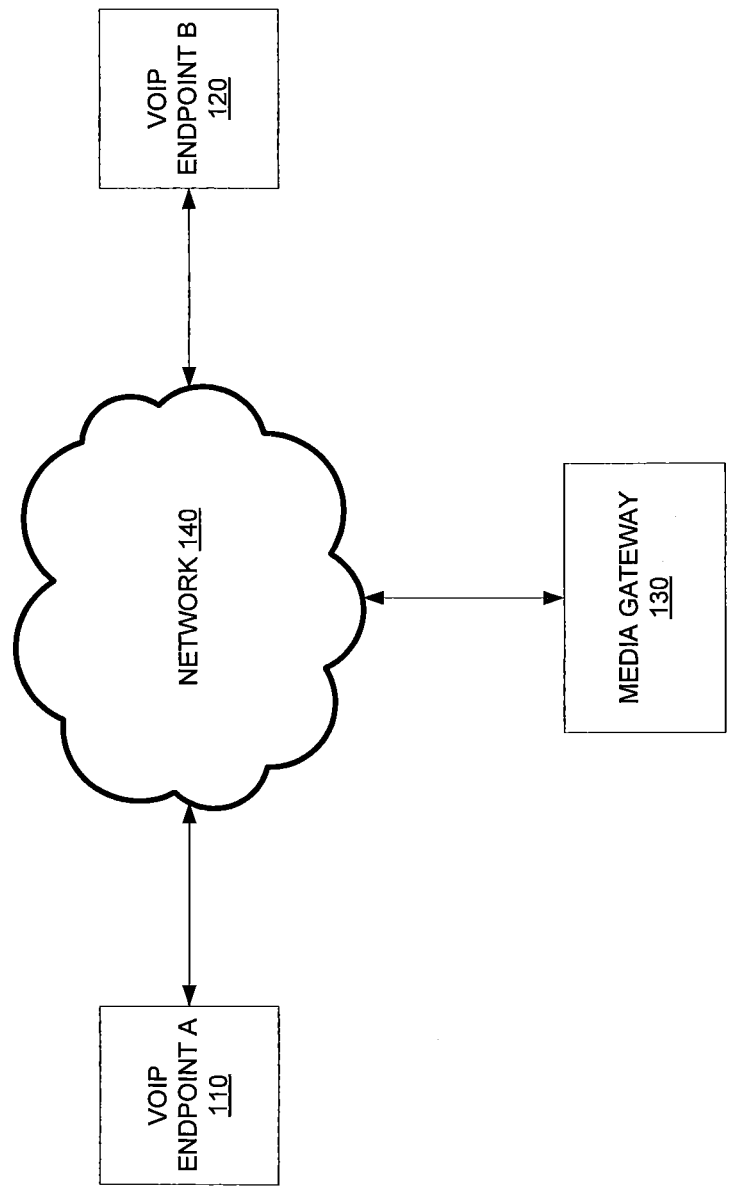
FIG. 1 shows a general network topology of one embodiment of the present disclosure.

With reference now to FIG. 1, a general network topology 100 is provided for one embodiment of the present disclosure. VOIP endpoint A 110 is one of a general user interface device that is capable of delivering voice communications over an IP network such as the Internet or other packet-switched networks. One having ordinary skill in the art will appreciate that the endpoint A 110 need not be a dedicated device, but may also be, for example, a softphone, which is a software program executed by a general purpose computer (e.g., Avaya Inc. IP Softphone), a personal digital assistant (PDA), personal computer, laptop, H.323 Desktop phone, packet-based H.320 video phone and conferencing unit, packet-based voice messaging and response units, peer-to-peer based communication device, and packet-based traditional computer telephony integration devices (i.e., adjuncts). VOIP endpoint B 120 is a device similar to, but not necessarily identical to that of endpoint A 110. The media gateway 130 is any suitable gateway device that controls ingress to and egress from a corresponding network. Gateways may be positioned logically between the components in an enterprise premises and the wide area network to process communications passing between the appropriate switch/server and the second network. Gateways may include an electronic repeater functionality that intercepts and steers electrical signals from one network to a different network (e.g., a wide area network (WAN) to a corresponding local area network (LAN)) and vice versa and provides code and protocol conversion. Additionally, the gateway can perform various security functions, such as network address translation, and set up and use secure tunnels to provide virtual private network capabilities. In some protocols, the gateway bridges conferences to other networks, communications protocols, and multimedia formats. The network 140 is shown to be in communication with endpoints A and B 110, 120 and media gateway 130. The network 140 is a computer network that interchanges data by packet switching. The network 140 may be comprised of multiple devices that are in communication with each other, and may include, for example, a LAN, a WAN, the Internet and a wireless network.

Figure 2A:
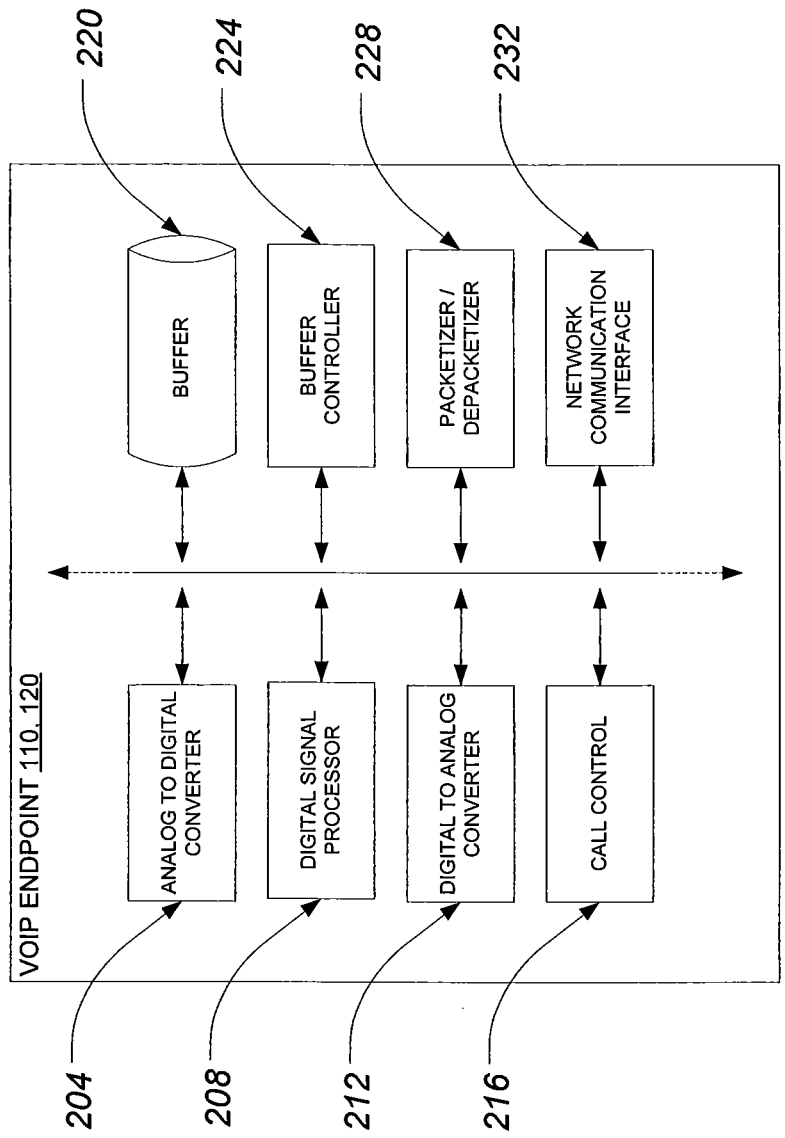
FIG. 2A shows typical elements that may be present in an endpoint in one embodiment of the present disclosure.

FIG. 2A shows typical elements that may be present in an endpoint A and B 110, 120 in one embodiment of the present disclosure, including a digital signal processor 208, an analog to digital converter 204, a digital to analog converter 212, a call control 216, a buffer 220, a buffer controller 224, a packetizer/depacketizer 228 and a network communication interface 232. The digital signal processor 208 is the processing center of the endpoint that executes machine instructions and performs logical operations. The converters 204, 212 are components that convert signals from analog form to digital form and vice versa. The buffer controller 224 is the component that controls the buffer 220. The buffer 220 may be one of a jitter buffer or de-jitter buffer, which is used to counter jitter introduced by packet switched networks so that a continuous playout of a media stream transmitted over a network 140 can be ensured.

Jitter is a variation in the delay of received packets. On the sending side, packets are sent on a continuous stream with an even rate where the packets are evenly spaced apart. Due to network congestion, improper queuing, or configuration errors, this steady stream can become disrupted or discontinuous, and the delay between each packet can vary instead of remaining constant. The buffer 220 solves this problem by intentionally delaying arriving packets by temporarily storing (buffering) received packets to minimize the impact of delay variations among packets, and playing the received packets in the correct order. Packets that arrive too late are discarded. The packetizer/depacketizer 228 is a component that generally sits in the transport layer in the OSI model of networking, which is between the session layer and the network layer, and handles packaging of data into discrete segments (packets) for transmission over a network. The network communication interface 232 is the component that provides the physical interface between the endpoint 110, 120 and the network, and may include, for example, a network interface card, a radio transmitter, a radio antenna, and an infrared device. The call control 216 is the component in the endpoints 110, 120 that performs the calculations and synchronization logic that enables the endpoint 110, 120 to switch over from centralized to decentralized media streams. Specifically, the call control 216 performs the steps described in FIG. 9 and communicates with buffer controller 224 and the packetizer/depacketizer 228 to effect the switch over.

Figure 2B:
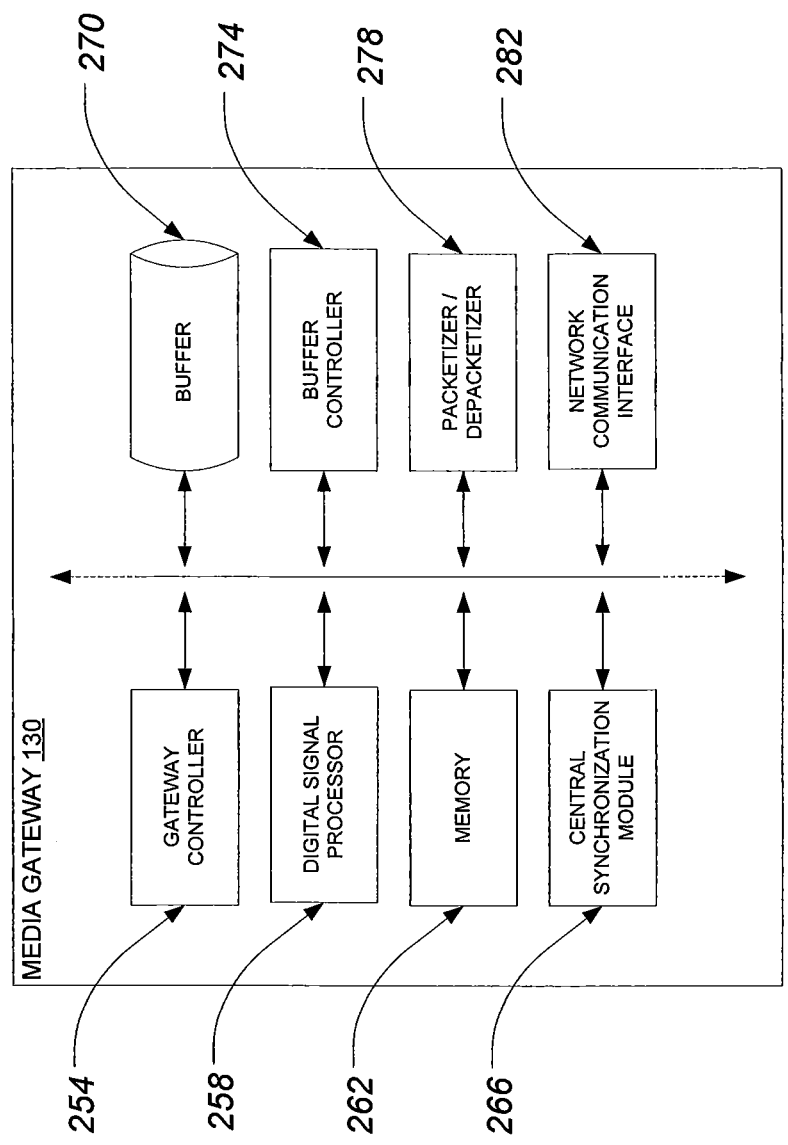
FIG. 2B shows typical elements that may be present in a media gateway in one embodiment of the present disclosure.

FIG. 2B shows typical elements that may be present in a media gateway 130 in one embodiment of the present disclosure, including a gateway controller 254, a digital signal processor 258, memory 262, a central synchronization module 266, a buffer 270, a buffer controller 274, a packetizer/depacketizer 278 and a network communication interface 282. The gateway controller 254 is a component that performs overall instruction for the media gateway 130. The controller 254 is the component by which a higher level enterprise component (e.g., enterprise resource planning component, failover controller, load balancing component) may communicate with the gateway 130, or by which the gateway 130 may communicate with other media gateway controllers in a distributed architecture. As with the digital signal processor 208, the digital signal processor 258 is the processing center of the media gateway 130 that executes machine instructions and performs logical operations. The memory 262 is an electronic storage area for application data. Similar to the buffer controller 224, the buffer controller 274 is the component that controls the buffer 270. Likewise, the buffer 270 is similar to the buffer 220 as described above; the packetizer/depacketizer 278 is similar to the packetizer/depacketizer 228 as described above; and the network communication interface 282 is similar to the network communication interface 232 as described above. The central synchronization module 266 is the component in the media gateway 130 that performs the calculations between media streams as described for FIG. 3 and the synchronization logic described in FIGS. 6 and 7 that enables the endpoints 110, 120 to switch over from centralized to decentralized media streams. The central synchronization module 266 also determines the point at which the media gateway 130 may close the centralized media streams.

FIG. 3 shows a centralized media stream 300. This figure shows the general aspects of a centralized media stream communication between two VOIP endpoints A and B 110, 120 operating through a media gateway 130. The communication generally takes place over four media streams 304, 308, 312 and 316. As indicated by the arrows, endpoint B 120 transmits data on stream 304 to the media gateway 130. The media gateway 130 transmits data on stream 308 to the endpoint A 110. The endpoint A 110 transmits data on stream 312 to the media gateway 130. The media gateway 130 transmits data on stream 316 to the endpoint B 120. The figure shows aspects of a packet in the stream 304 such as the timestamp, the sequence number and the synchronization source (SSRC). The figure shows the corresponding data in a packet in Stream 308 with aspects such as timestamp, sequence number and SSRC. The figure shows timestamp, sequence number and SSRC of a packet in the stream 312, and corresponding information for a packet containing the same data in stream 316. This figure illustrates that the data communicated between endpoints A and B 110, 120, are in four streams, or at least two separately negotiated sessions. FIG. 3 further shows a difference in the timestamp, sequence number and SSRC for packets that correspond to the same data. For example, a packet transmitted by endpoint B 120 in stream 304 with a timestamp equal to 332211, a sequence number equal to 101, and SSRC equal to 1111, will be received by the media gateway 130. The packet may be inspected, then is repackaged and transmitted in stream 308 with a timestamp equal to 12345, a sequence number equal to 67 and SSRC equal to 8901. The difference between the two packets in the streams 304 and 308 is a timestamp difference of 319866 and a sequence difference of 34. A packet transmitted by endpoint A 110 in stream 312 with a timestamp equal to 43212, a sequence number equal to 889 and SSRC equal to 2222, will be received by the media gateway 130. The packet may also be inspected, then is repackaged and transmitted in stream 316 with a timestamp equal to 89123, sequence number equal to 45 and SSRC equal to 6666. The difference between the two packets in the streams 312 and 316 is a timestamp difference of −45911 and a sequence number difference of 844. As used herein, "synchronization information" is meant to include the difference calculations as described herein, as well as any reference data that may be required by an endpoint A or B 110, 120, or may be used by the media gateway 130 to contextualize the difference calculations.

Figure 4:
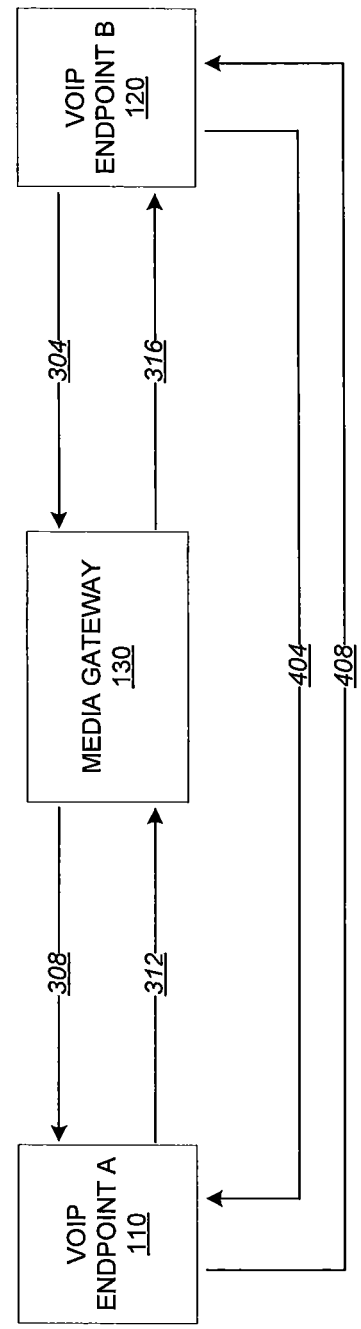
FIG. 4 shows a parallel media stream comprising a centralized media stream and a decentralized media stream.

FIG. 4 shows a parallel media stream configuration 400 comprising a centralized media stream and a decentralized media stream. In addition to the media streams 304, 308, 312 and 316, the figure illustrates that endpoint B 120 transmits data on stream 404 to endpoint A 110, and endpoint A 110 transmits data on media stream 408 to endpoint B 120. One having ordinary skill in the art will appreciate that the six media streams presented in the figure of this embodiment are comprised of packet data.

Figure 5:
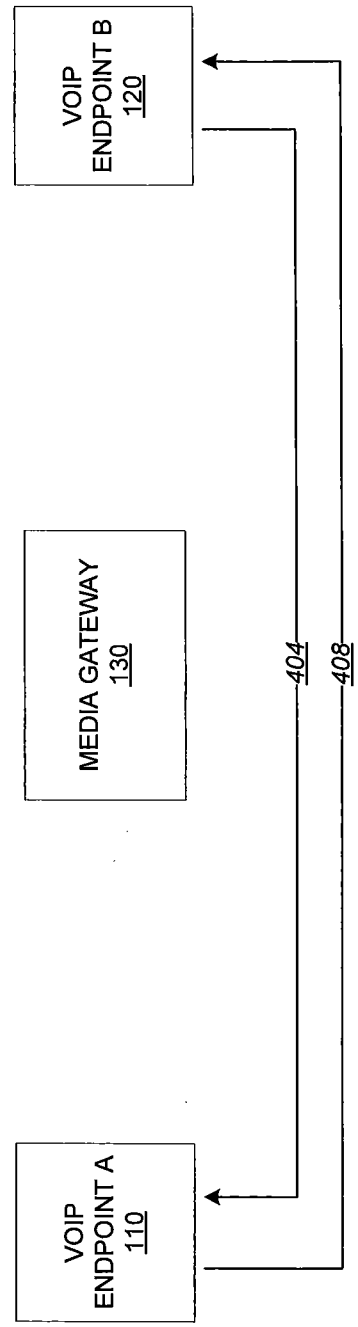
FIG. 5 shows a decentralized media stream.

FIG. 5 shows a decentralized media stream configuration 500 having only the media streams 404 and 408. In a decentralized configuration, the centralized streams 304, 308, 312 and 316 have been closed, or alternatively never formed, and the media gateway 130 does not participate in the media stream communication between endpoints A and B 110, 120.

One having ordinary skill in the art will appreciate that in one embodiment of the present disclosure, the communication between endpoints A and B 110, 120 and media gateway 130 in FIGS. 3, 4 and 5 occur over network 140.

Figure 6:
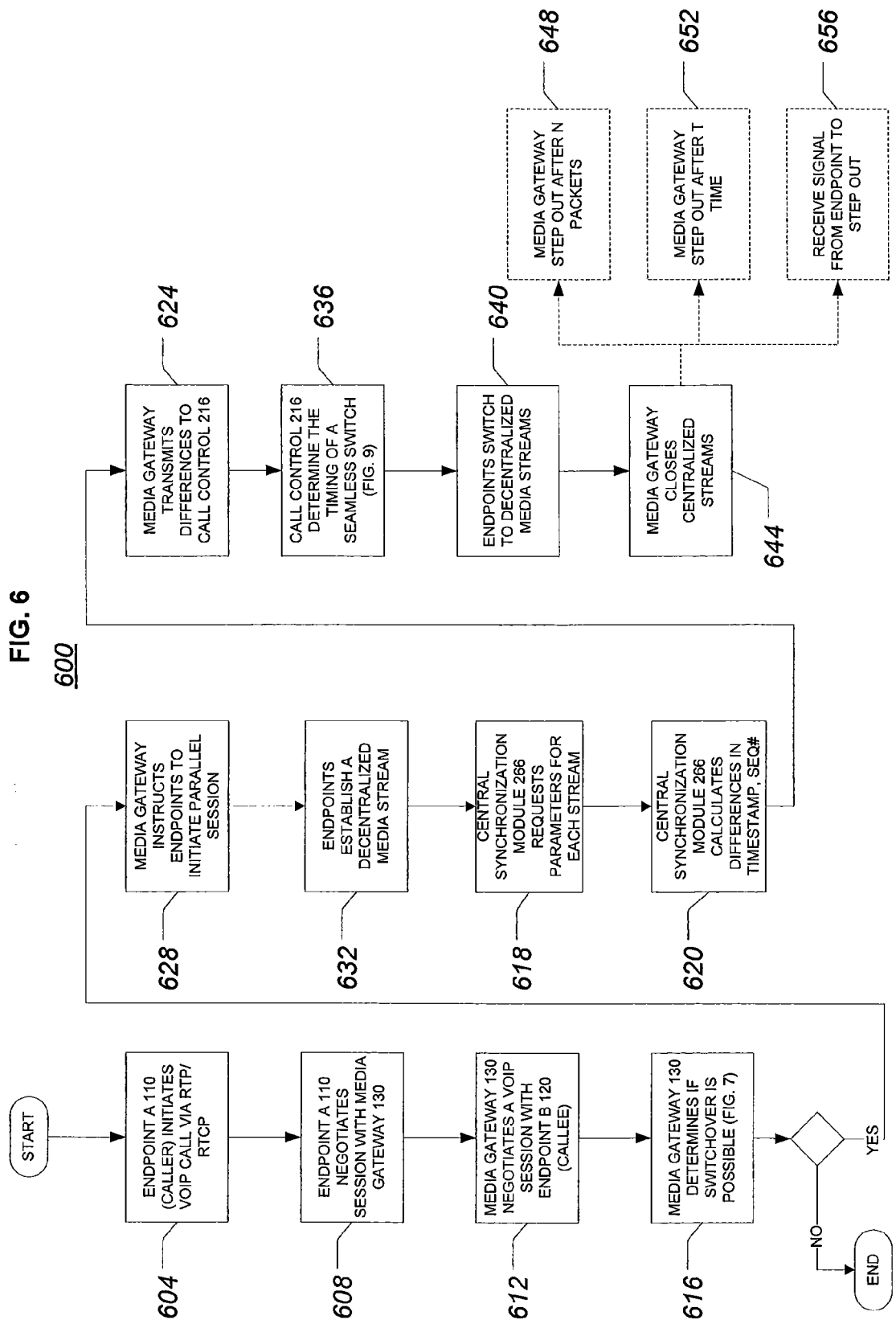
FIG. 6 shows a flow diagram of the process in one embodiment of the present disclosure.

FIG. 6 shows a flow diagram of the process 600 in one embodiment of the present disclosure. In the first step 604, endpoint A 110, operated by the caller party, initiates a call. In 608, the endpoint A 110 negotiates a session with media gateway 130. In step 612, media gateway 130 negotiates a session with endpoint B 120, operated by the callee party. One having skill in the art will appreciate that the foregoing sessions may be established using known methods and protocols including, for example, Real Time Protocol ("RTP") and RTP Control Protocol ("RTCP"). In step 616, the media gateway 130 determines whether a switch over to a decentralized media stream is possible. The determination 616 is further explained below in the description of FIG. 7. If it is determined that a switch over is not possible, the process 600 ends. If it is determined that a switch over is possible, the media gateway 130, in step 628, communicates to the endpoints A and B 110, 120, to initiate a parallel, decentralized session. One having ordinary skill in the art will appreciate that this communication 628 may contain the necessary information to allow the endpoints to establish the independent session including, for example, address information of the other endpoint. In step 632, the endpoints A and B 110, 120, establish a parallel media stream (i.e., a decentralized media stream), creating the configuration as shown in FIG. 4 with both centralized and decentralized media streams operating simultaneously. In step 618, the central synchronization module 266 requests parameters of each media stream. In step 620, the central synchronization module 266 calculates the differences in timestamp and sequence numbers as exemplified in FIG. 3. In step 624, the media gateway 130 communicates the calculated difference information to the call control 216 of endpoints A and B 110, 120. In step 636, the call control 216 of endpoints A and B 110, 120 use the incoming media streams 308 and 316 together with the communicated difference information to determine the timing of a seamless switch. The determination of 636 is further explained in the description below of FIG. 9. In step 640, the endpoints A and B 110, 120 switch to the corresponding decentralized media streams 404 and 408 respectively. It will be appreciated by one having skill in the art that this switch need not be made simultaneously by the endpoints A and B 110, 120, and that the endpoint A 110 that receives stream 308 may switch to stream 404 at a time that is independent of endpoint B 120 switching from stream 316 to stream 408. In step 644, the centralized streams 304, 308, 312 and 316 are closed by the media gateway 130, creating the wholly decentralized configuration as exemplified in FIG. 5. Steps 648, 652 and 656 indicate alternative steps to 644 that may occur to effect the closure of the centralized media stream including closure of a media stream after a predetermined number of packets N 648, closure of a media stream after a predetermined time T 652, and signaling from an endpoint for closure of a media stream 656. The signaling from an endpoint step 656 may comprise a signal known in the art to close the specific media stream. This signal may be communicated from the signaling endpoint directly to the corresponding endpoint in a decentralized manner, or the signal may be communicated to the corresponding endpoint in a centralized manner as part of the session negotiation. The closure of a centralized media stream may also be a combination of the above steps 644, 648, 652 and 656. One having skill in the art will appreciate that the centralized streams 304 and 308 may be closed independently of centralized streams 312 and 316.

In an alternative embodiment of the present disclosure, the steps of flow 600 may be processed in a different order. Specifically, after the determination step 616, the media gateway 130 may then perform the step 620 of calculating synchronization information. The media gateway 130, may then transmit the difference information to the endpoints A and B 110, 120 in step 624, and thereafter instruct the endpoints to initiate parallel sessions in 628. The endpoints then proceed to establish a decentralized stream in step 632. One having ordinary skill in the art will appreciate that other aspects of flow 600 may proceed in a different order, that certain steps of flow 600 may also be performed simultaneously, and that certain steps may be combined. Specifically, in another embodiment of the present disclosure, the establishment of a parallel decentralized stream by the endpoints A and B 110, 120 in step 632 may occur while the step 620 of calculating synchronization information is performed by the media gateway 130. In yet another embodiment of the present disclosure, the transmission of synchronization information step 624 and instruction step 628 may be combined into a single step (i.e., the endpoints A and B 110, 120 may interpret the synchronization information to be an implicit instruction to initiate a parallel session).

Figure 7:
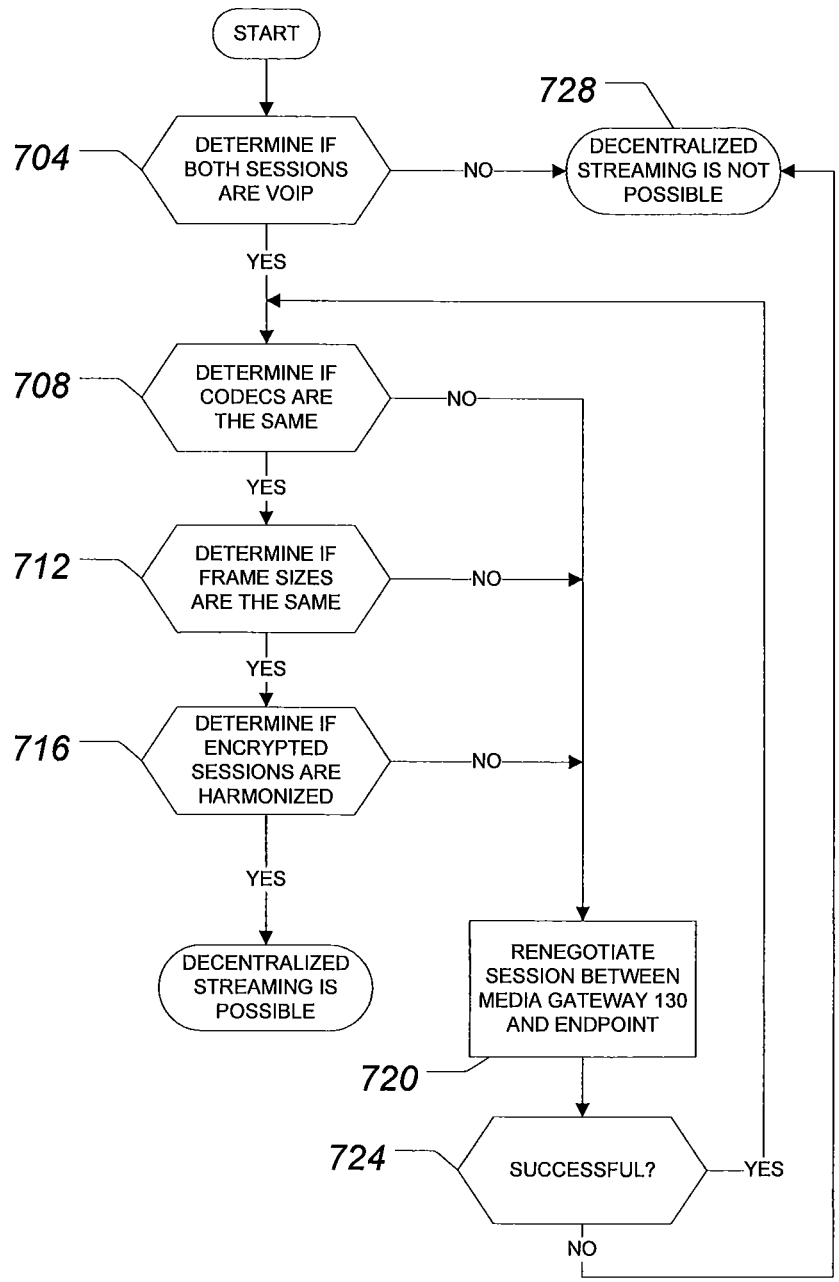
FIG. 7 shows a flow diagram of one aspect of the process in one embodiment of the present disclosure.

FIG. 7 shows a flow diagram 700 of the details of step 616 in one embodiment of the present disclosure. In step 704, a determination is made as to whether the session between endpoint A 110 and the media gateway 130 is a VOIP session, and whether the session between endpoint B 120 and the media gateway 130 is a VOIP session. If at least one session is not a VOIP session, then the process ends in step 728 and a switch to decentralized streaming is not possible. If both sessions are VOIP, then in step 708, a determination is made as to whether the codecs used in a single stream path are the same. For example, referring to FIG. 3, the codec used in stream 304 is compared to the codec used in stream 308; accordingly, the codec used in stream 312 is compared to the codec used in stream 316. If there is a mismatch in codecs among respective streams, a session is renegotiated 720 to harmonize the codec. As used herein, "harmonize" means to make the same. For example, for the comparison of codecs in step 708, the codecs of two sessions are harmonized by using the same codec for both sessions. If the renegotiation is successful 724, the process returns to step 708. If the codecs are harmonized, then in 712, a determination is made as to whether the frame sizes used in a single stream path are the same. For example, referring again to FIG. 3, the frame size of stream 304 is compared to the frame size of stream 308; and the frame size of stream 312 is compared to the frame size of stream 316. If there is a mismatch in frame sizes among respective streams, a session is again renegotiated 720 to harmonize the frame size. If the frame sizes are harmonized, then in 716, a determination is made as to whether the encrypted sessions, if any, are harmonized. If an encrypted session is detected, then a session may be renegotiated 720 to perform the appropriate key exchange and harmonize encryption between streams 304 and 308, and between streams 312 and 316. If the encrypted sessions are harmonized, then decentralized streaming is possible. In this case, harmonization of encrypted sessions may involve, for example, key exchanges in a public key, one-way encryption scenario, or establishing a secure channel in the case of pre-shared keys. The different manners of harmonizing the sessions will depend on the security protocols and policy in place among the endpoints A and B 110, 120 and the media gateway 130. One having skill in the art will appreciate the necessary steps to effect harmonization among secure sessions. If any of the renegotiations 720 are unsuccessful, then the process ends 728 and a switch to decentralized streaming is not possible. The process 700 is one embodiment of the present disclosure, and it is understood that one having skill in the art will appreciate different configurations of the steps to effect the same determination as to whether a decentralized media stream configuration 500 is possible.

Figure 8:
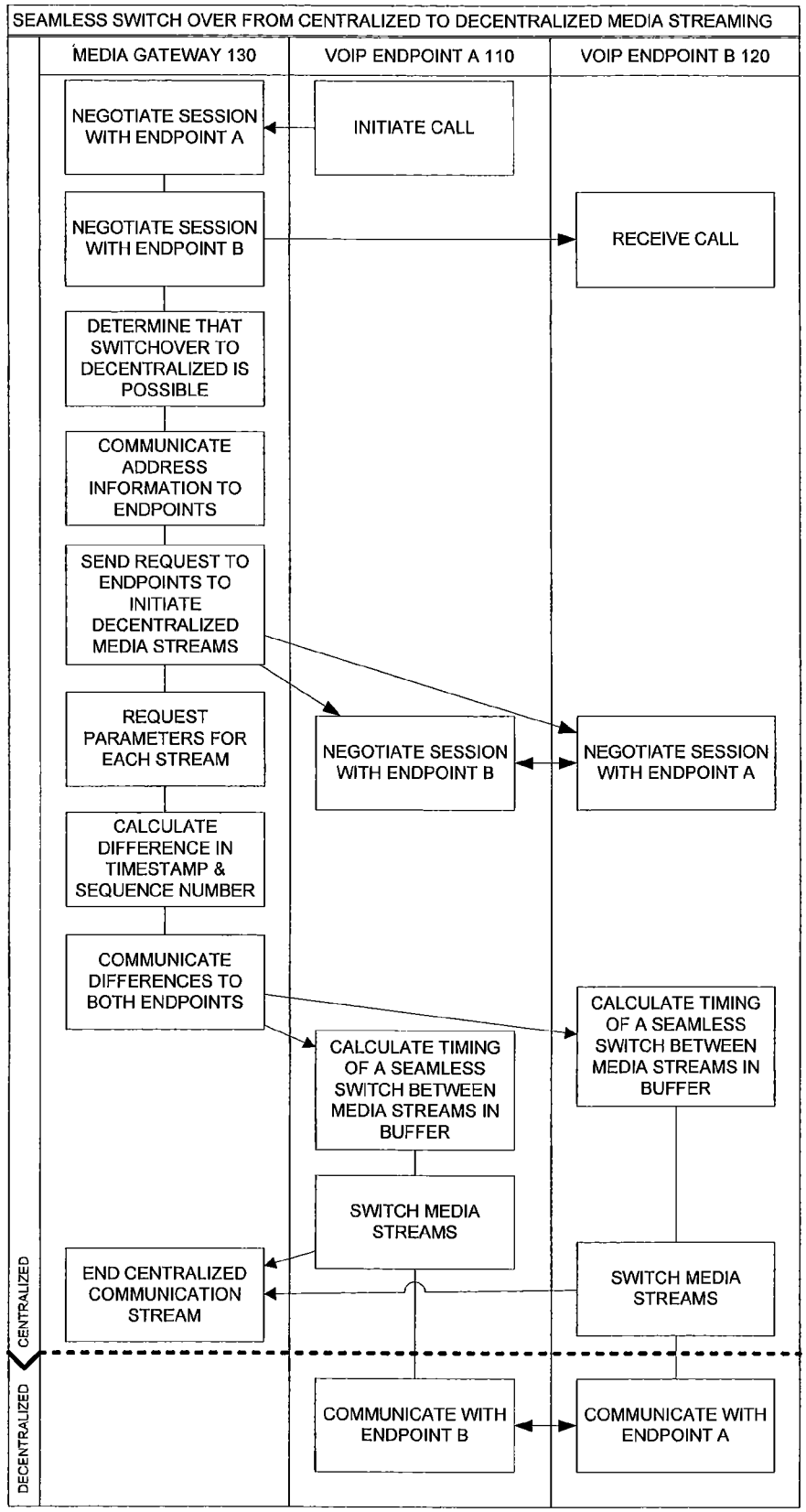
FIG. 8 shows a flow chart of the process in one embodiment of the present disclosure.

FIG. 8 shows a flow chart that exemplifies the process 600 in one embodiment of the present disclosure, wherein the process steps are represented in columns that indicate the component (e.g., the endpoints A and B 110, 120 and the media gateway 130) performing the respective step of the process 600.

Figure 9:
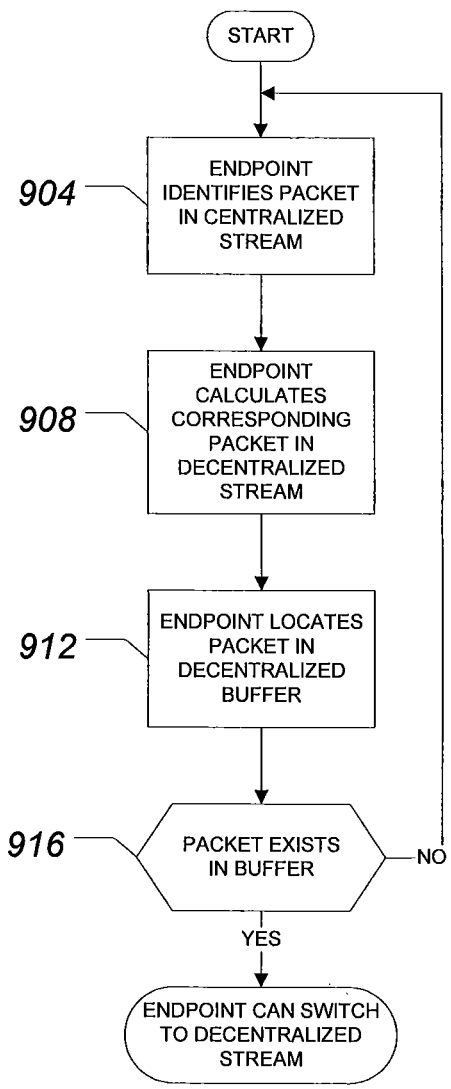
FIG. 9 shows a flow diagram of the process in one embodiment of the present disclosure.

FIG. 9 shows a flow diagram 900 of the details of step 636 in one embodiment of the present disclosure. In step 904, the endpoint identifies a packet in the buffer 220 for the centralized media stream 308, 316. The identified packet may be any packet in the buffer 220 for the centralized media stream, but preferably a packet that has not yet been processed by the endpoint. In step 908, the endpoint calculates the corresponding packet in the decentralized media stream 404, 408 that corresponds to the identified packet in the centralized media stream 308, 316 respectively. In step 912, the endpoint locates the calculated packet in the buffer 220 for the decentralized media stream. A determination is made in 916 as to whether the calculated packet exists in the decentralized buffer. If the packet is not found to exist in the buffer 220, then the buffer 220 has not yet received the corresponding decentralized packet, and the process returns to step 904. If the packet is found to exist in the buffer 220, the buffer 220 now contains redundant data and the determination is that the endpoint can switch over to the decentralized stream 404, 408.

One having skill in the art will appreciate that the endpoints A and B 110, 120 are not necessarily limited to VOIP endpoints, but may, in other embodiments, be another media gateway or other network device capable of buffering packets and negotiating sessions.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

The disclosure, in various embodiments, include components, methods, processes, systems and/or apparatus substantially as depicted and described herein, including various embodiments, sub-combinations, and subsets thereof. Those having ordinary skill in the art will understand how to make and use the embodiments after understanding the present disclosure.

The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the invention to the form or forms disclosed herein. In the foregoing detailed description for example, various features are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment.

Moreover, though the description has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method comprising:
    setting up, by a media gateway, a centralized media stream passing between a first endpoint and a second endpoint and through the media gateway;
    setting up a decentralized media stream passing between the first and second endpoints, but bypassing the media gateway, the centralized and decentralized media streams being temporally overlapping;
    calculating, by the media gateway, a first difference between a first segment of the centralized media stream incoming to the media gateway from the first endpoint and a second segment of the centralized media stream outgoing from the media gateway to the second endpoint;
    sending to the second endpoint the first difference and a first electronic identifier associated with the first endpoint, wherein the first difference and the first electronic identifier are used by the second endpoint to synchronize the centralized media stream to the decentralized media stream;
    synchronizing, by the second endpoint, the centralized and decentralized media streams; and
    disconnecting, by the at least one of the first and second endpoints, the centralized media stream while continuing the decentralized media stream.

2. The method of claim 1, wherein the centralized media stream is set up before the decentralized media stream and disconnected before the decentralized media stream is disconnected and wherein the first difference is based on a difference of timestamps and based on a difference of sequence numbers.

3. The method of claim 1, calculating, by the media gateway, a second difference between a third segment of the centralized media stream incoming to the media gateway from the second endpoint and a fourth segment of the centralized media stream outgoing from the media gateway to the first endpoint; and sending to the first endpoint the second difference and a second electronic identifier associated with the second endpoint, wherein the second difference and the second electronic identifier are used by the first endpoint to synchronize the centralized media stream to the decentralized media stream.

4. The method of claim 3, wherein the first and second electronic identifiers are synchronization source identifiers and wherein the first and second differences are each a difference between an incoming timestamp for an incoming packet having a first payload and an outgoing timestamp for an outgoing packet having the first payload, wherein the incoming packet and the outgoing packet are in the centralized media stream.

5. The method of claim 3, wherein the first and second electronic identifiers are synchronization source identifiers and wherein the first and second differences are each a difference between a packet sequence number for an incoming packet having a first payload and a packet sequence number of an outgoing packet having the first payload.

6. The method of claim 1, wherein the centralized media stream is disconnected upon the occurrence of at least one of transmission and/or receipt by the media gateway of a predetermined number of packets, passage of a predetermined time, and receipt, by the media gateway, of a signal from an endpoint, the signal requesting disconnection of the centralized media stream.

7. The method of claim 3, wherein the setting up step comprises the sub-steps: determining that the first, second, third and fourth media stream segments define a Voice over Internet Protocol session between the first and second endpoints; determining that both the first and second media stream segments use at least one of a common and negotiable codec; determining that the third and fourth media stream segments use at least one of a common and negotiable codec; determining that the first and second media stream segments use at least one of a common and negotiable frame size; determining that the third and fourth media stream segments use at least one of a common and negotiable frame size; and harmonizing encryption parameters between the first and second media stream segments; and harmonizing encryption parameters between the third and fourth media stream segments.

8. The method of claim 1, wherein the disconnecting step comprises the sub-steps: identifying, by the first endpoint, a packet in a first buffer of the endpoint, the packet being from the centralized media stream; calculating, by the first endpoint, a corresponding packet in the decentralized stream; locating the corresponding packet in a second buffer, the second buffer being associated with the decentralized media stream; and in response to locating the corresponding packet in the second buffer, determining that the centralized media stream may be disconnected.

9. A non-transitory computer readable medium comprising processor-executable instructions to perform the steps of claim 1.

10. A media gateway, comprising:
a processor that:
sets up a centralized media stream passing between a first endpoint and a second endpoint and through the media gateway;
sets up a decentralized media stream passing between the first and second endpoints, but bypassing the media gateway, the centralized and decentralized media streams being temporally overlapping;
provides synchronization information to at least one of the first and second endpoints to enable synchronization by the at least one of the first and second endpoints of the centralized and decentralized media streams, wherein the synchronization information includes a first difference and a first electronic identifier associated with at least one of the first and second endpoints, wherein the first difference and the first electronic identifier are used by the second endpoint to synchronize the centralized media stream to the decentralized media stream, wherein the media gateway calculates the first difference as a difference between a first segment of the centralized media stream incoming to the media gateway and a second segment of the centralized media stream outgoing from the media gateway; and
after synchronization is completed, disconnects the centralized media stream in favor of the decentralized media stream.

11. The media gateway of claim 10, wherein the centralized media stream is set up before the decentralized media stream and disconnected before the decentralized media stream is disconnected and wherein the first difference is based on a difference of timestamps and based on a difference of sequence numbers.

12. The media gateway of claim 10, wherein the synchronizing operation comprises the sub-operations: calculate a second difference between a third segment of the centralized media stream incoming to the media gateway from the second endpoint and a fourth segment of the centralized media stream outgoing from the media gateway to the first endpoint; send to the second endpoint the first difference and a first electronic identifier associated with the first endpoint; and send to the first endpoint the second difference and a second electronic identifier associated with the second endpoint, wherein the second difference and the second electronic identifier are used by the first endpoint to synchronize the centralized media stream to the decentralized media stream.

13. The media gateway of claim 12, wherein the first and second electronic identifiers are synchronization source identifiers and wherein the first and second differences are each a difference between a timestamp for an incoming packet having a first payload and a timestamp for an outgoing packet having the first payload, wherein the incoming packet and the outgoing packet are in the centralized media stream.

14. The media gateway of claim 12, wherein the first and second electronic identifiers are synchronization source identifiers and wherein the first and second differences are each a difference between a sequence number of an incoming packet having a first payload and a sequence number of an outgoing packet having the first payload.

15. The media gateway of claim 10, wherein the centralized media stream is disconnected upon the occurrence of at least one of transmission and/or receipt by the media gateway of a predetermined number of packets, passage of a predetermined time, and receipt, by the media gateway, of a signal from an endpoint, the signal requesting disconnection of the centralized media stream.

16. The media gateway of claim 12, wherein the operation of setting up the decentralized media stream comprises the sub-operations: determine that the first, second, third and fourth media stream segments define a Voice over Internet Protocol session between the first and second endpoints; determine that both the first and second media stream segments use at least one of a common and negotiable codec; determine that the third and fourth media stream segments use at least one of a common and negotiable codec; determine that the first and second media stream segments use at least one of a common and negotiable frame size; determine that the third and fourth media stream segments use at least one of a common and negotiable frame size; and harmonize encryption parameters between the first and second media stream segments; and harmonize encryption parameters between the third and fourth media stream segments.

17. The media gateway of claim 10, wherein the disconnect operation comprises the sub-operations: identify, by the first endpoint, a packet in a first buffer of the first endpoint, the packet being from the centralized media stream; calculate, by the first endpoint, a corresponding packet in the decentralized stream; locate the corresponding packet in a second buffer of the first endpoint, the second buffer being associated with the decentralized media stream; and in response to locating the corresponding packet in the second buffer, determining that the centralized media stream may be disconnected.

18. An endpoint, comprising:

a network communication interface in communication with a centralized media stream passing through a media gateway and terminating at a remote endpoint and in communication with a decentralized media steam terminating at the remote endpoint and bypassing the media gateway, the centralized and decentralized media streams being simultaneously active;

a processor in communication with the network communication interface, the processor executing a call control device, the call control device:

receiving synchronization information from the media gateway, wherein the synchronization information includes a first difference and a first electronic identifier associated with the remote endpoint, wherein the media gateway calculates the first difference as a difference between a first segment of the centralized media stream incoming to the media gateway and a second segment of the centralized media stream outgoing from the media gateway; and synchronizing the centralized and decentralized media streams, by using the first difference and the first electronic identifier associated with the remote endpoint to enable switch over from the centralized media stream to the decentralized media stream.

19. The endpoint of claim 18, wherein the centralized media stream is set up before the decentralized media stream and disconnected before the decentralized media stream is disconnected, and wherein the synchronization information comprises a synchronization source identifier associated with the remote endpoint and a difference between a timestamp of an incoming packet having a first payload and a packet timestamp of an outgoing packet having the first payload.

20. The endpoint of claim 18, wherein the synchronization information comprises a synchronization source identifier associated with the remote endpoint and a difference between a sequence number of an incoming packet having a first payload and a sequence number of an outgoing packet having the first payload, wherein the incoming packet and the outgoing packet are in the centralized media stream.

* * * * *